(12) United States Patent
Irwin

(10) Patent No.: US 7,590,855 B2
(45) Date of Patent: Sep. 15, 2009

(54) STEGANOGRAPHICALLY AUTHENTICATED PACKET TRAFFIC

(75) Inventor: Victoria Lynn Irwin, Cedar Park, TX (US)

(73) Assignee: TippingPoint Technologies, Inc., Austin, TX (US)

( * ) Notice: Subject to any disclaimer, the term of this patent is extended or adjusted under 35 U.S.C. 154(b) by 822 days.

(21) Appl. No.: 10/136,896

(22) Filed: Apr. 30, 2002

(65) Prior Publication Data

US 2003/0204728 A1 Oct. 30, 2003

(51) Int. Cl.
*H04L 9/32* (2006.01)

(52) U.S. Cl. .................... 713/181; 713/168; 726/22; 726/25

(58) Field of Classification Search ......... 713/160–162, 713/168–170, 176, 179–181, 153, 154; 726/22–25, 726/13, 11; 380/28, 29, 30, 255, 42, 37; 709/223–225, 227, 238, 229; 705/67; 370/389, 370/229, 351; 714/47
See application file for complete search history.

(56) References Cited

U.S. PATENT DOCUMENTS

| | | | | |
|---|---|---|---|---|
| 4,965,827 A * | 10/1990 | McDonald | ............... | 705/65 |
| 5,539,659 A * | 7/1996 | McKee et al. | ............... | 709/224 |
| 5,835,726 A * | 11/1998 | Shwed et al. | ............... | 709/229 |
| 5,850,449 A * | 12/1998 | McManis | ............... | 713/161 |
| 5,958,053 A * | 9/1999 | Denker | ............... | 726/1 |
| 6,005,938 A * | 12/1999 | Banker et al. | ............... | 380/239 |
| 6,084,969 A * | 7/2000 | Wright et al. | ............... | 380/271 |
| 6,108,583 A * | 8/2000 | Schneck et al. | ............... | 700/9 |
| RE37,178 E * | 5/2001 | Kingdon | ............... | 713/170 |
| 6,229,806 B1 * | 5/2001 | Lockhart et al. | ............... | 370/389 |
| 6,253,321 B1 * | 6/2001 | Nikander et al. | ............... | 713/160 |
| 6,389,532 B1 * | 5/2002 | Gupta et al. | ............... | 713/163 |
| 6,393,472 B1 * | 5/2002 | Anerousis et al. | ............... | 709/223 |
| 6,546,493 B1 * | 4/2003 | Magdych et al. | ............... | 726/25 |
| 6,687,833 B1 * | 2/2004 | Osborne et al. | ............... | 726/23 |
| 6,751,728 B1 * | 6/2004 | Gunter et al. | ............... | 713/153 |
| 6,795,917 B1 * | 9/2004 | Ylonen | ............... | 713/160 |
| 6,804,240 B1 * | 10/2004 | Shirakawa et al. | ............... | 370/392 |
| 6,888,797 B1 * | 5/2005 | Cao et al. | ............... | 370/235 |
| 6,985,583 B1 * | 1/2006 | Brainard et al. | ............... | 380/44 |
| 7,055,027 B1 * | 5/2006 | Gunter et al. | ............... | 713/151 |
| 7,136,926 B1 * | 11/2006 | Iyer et al. | ............... | 709/229 |
| 7,216,230 B2 * | 5/2007 | Suzuki et al. | ............... | 713/170 |
| 2002/0037078 A1 * | 3/2002 | Yanovsky | ............... | 380/37 |

* cited by examiner

*Primary Examiner*—Kimyen Vu
*Assistant Examiner*—Nirav Patel
(74) *Attorney, Agent, or Firm*—Andre M. Szuwalski; Gardere Wynne Sewell LLP

(57) ABSTRACT

To assist a destination/intermediary node in authenticating a communications packet as originating from a certain source node, the source node hides a cryptographically generated first special value based on the packet in a header portion of the communications packet. Upon receipt of the communications packet, the destination/intermediary node cyptographically generates a second special value also based on the packet for comparison to the first special value extracted from hiding in the header portion. If the first and second special values match, the destination/intermediary node has authenticated the communications packet as originating from the source node. The foregoing may be implemented in a number of situations, but has special use in connection with the detection of packet communications vulnerability assessment probe traffic by an intrusion detection system.

38 Claims, 4 Drawing Sheets

STEGANOGRAPHICALLY AUTHENTICATED PACKET TRAFFIC

BACKGROUND OF THE INVENTION

1. Technical Field of the Invention

The present invention relates to packet communications traffic and, in particular, to cryptographically signing packet traffic and, even more specifically, to the use of steganographic techniques to hide authentication information in packet communications.

2. Description of Related Art

The Greek term "steganography" refers to the art and science of hiding the existence of information using various secret "hidden writing" communication techniques that allow important messages to be securely carried over insecure communications channels. Steganography achieves confidentiality with respect to a transmitted secret message by hiding that message inside of a larger context. In this way, the secret message is kept from someone who is not supposed to read the message because they neither know how to read it, nor even recognize it is present in the context. Someone who is supposed to read the message, however, possesses a key that permits the message to be both detected in the context and read.

Steganographic techniques have, in the past, been primarily associated with, for example, invisible inks, messages sent via telephone line noise, and red cellophane such as that used in games to reveal information hidden in a red-blue block. More recently, steganographic techniques have been used in the computer environment to hide information in graphical images, sound files, text files, or other media.

An important characteristic of a steganography process is imperceptibility. By this it is meant that the existence of a stenographically hidden message should not be readily apparent from a review of the carrying media (i.e., the context). More generally, the media in which the message is hidden should not draw any attention to itself in a way that makes the perceiver suspicious of hidden content. Thus, the goal of steganography is to hide messages inside other "harmless" messages in a way that does not allow any enemy to even detect that there is a second secret message present.

Most common steganography techniques lose their security when the steganographic operation of the process (i.e., its key) is known, and thus should be used together with key based encryption for additional security. A good steganography process should therefore fulfill the cryptographic "Kerckhoff principle" requirement. In this context, one assumes that the "enemy" has full knowledge of the design and implementation details of the steganographic process. Security is then provided for the process by means of a short, easily exchangeable, secret key, the knowledge of which is required by the enemy in order to obtain the hidden information.

By combining the Kerckhoff requirement with the imperceptibility characteristic, an ideal steganography process should be designed in a manner such that the enemy has very little chance of becoming suspicious that hidden information is present and, without knowledge of the secret key, no chance of actually being able to recover that hidden information.

With the development of the Internet for linking computers, and the evolution of the Internet protocol (IP) for defining how messages are communicated between linked computers, a need had arisen for using packets as a media for conveying hidden information. The present invention addresses that need in particular as well as other needs concerning the communication of packetized information that are recognized by those skilled in the art.

SUMMARY OF THE INVENTION

In accordance with one aspect of the present invention, a first node cryptographically generates a first special value relating to a communications packet, and hides that first special value in at least one field of a header portion of the communications packet. The communications packet is then transmitted from the source node toward a destination/intermediary node over a network. At the destination/intermediary node, or at some intermediary monitoring node, the received communications packet is authenticated by cryptographically generating a second special value relating to the received communications packet. This second special value is then compared to the first special value as extracted from hiding in the header field of the received communications packet. Authentication is found when there is a match between the extracted first special value and the generated second special value.

In accordance with another aspect of the present invention, the source node comprises a vulnerability assessment scanner, the network is an untrusted network, and the destination node comprises a node within a trusted network. The intermediary node performs the authentication and comprises an intrusion detection system that protects the destination node within the trusted network.

BRIEF DESCRIPTION OF THE DRAWINGS

A more complete understanding of the method and apparatus of the present invention may be acquired by reference to the following Detailed Description when taken in conjunction with the accompanying Drawings wherein.

DETAILED DESCRIPTION OF THE DRAWINGS

Figure 1:
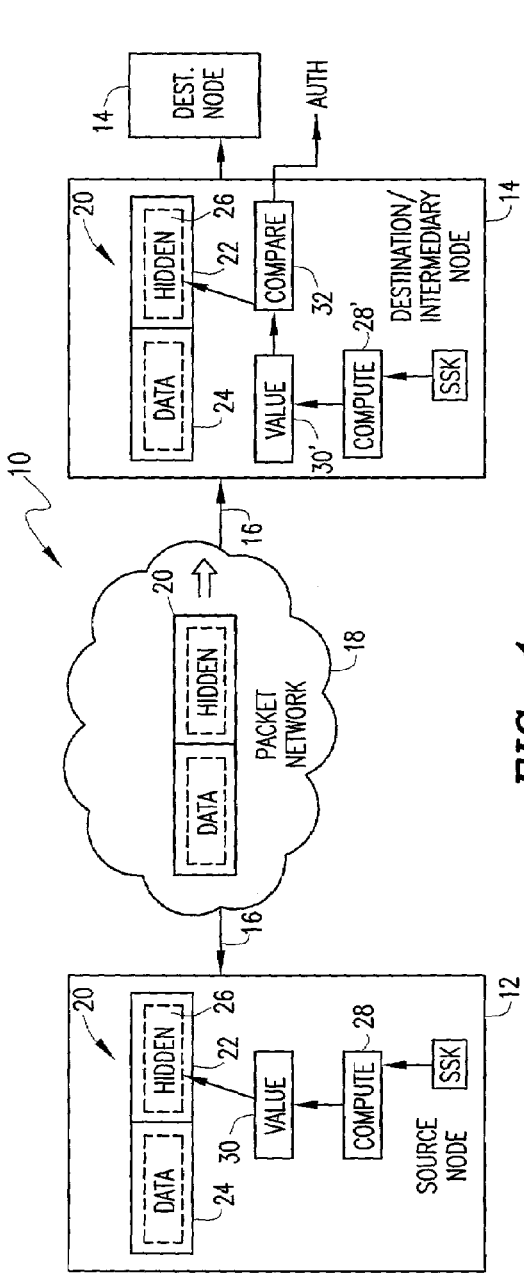
FIG. 1 is a block diagram of a communications system in which the steganography process of the present invention may be implemented.

Reference is now made to FIG. 1 wherein there is shown a block diagram of a communications system 10 in which the steganography process of the present invention may be implemented. The communications system 10 includes a source node 12 and a destination/intermediary node 14. The recitation of an intermediary node 14 refers to a situation where a node is present in the communications system in between the source node and the destination node (see, for example, FIG. 6). The source node 12 and destination/intermediary node 14 are interconnected by a communications link 16 that comprises a portion of a packet-based communications network 18. Packet communications over the network 18 are governed by an appropriate packet communications protocol. One example of such a protocol is the well known Internet protocol (IP) using transaction control protocol (TCP). It will, of course, be understood that other protocols (for example, UDP/IP, and the like) may alternatively be used for communication over the network 18 between the source node 12 and destination/intermediary node 14.

Figure 2:
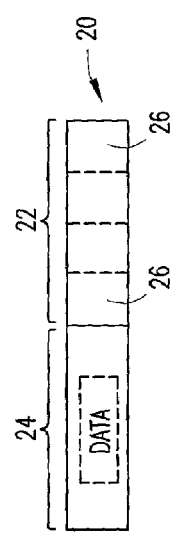
FIG. 2 is a diagram illustrating the format of a communications packet.

The format of a communications packet 20 (for example, an IP packet, TCP packet, UDP packet, and the like) is shown in FIG. 2. Generally speaking, the packet 20 includes a header portion 22 and a payload portion 24. The header portion 22 contains a number of fields 26. Examples of such fields for an IP packet may include an origination field (identifying the source node 12), a destination field (identifying the destination node 14), an identification (ID) field, and the like. The payload portion 24 contains the data payload to be communicated from the source node 12 to the destination/intermediary node 14.

It will be recognized by those skilled in the art that other forms of header portions 22 may be used as well. For example, in the case of an IP packet carried by TCP or UDP (i.e., TCP/IP or UDP/IP), a header portion 22 exists with respect to the TCP and/or UDP transport functionality. This header portion 22, like that with the IP packet, also contains fields 26, and these included fields may provide, for example, destination and origination port information.

With reference once again to FIG. 1, the steganography process of the present invention generally operates at the source node 12 to compute 28 a cryptographic special value 30 for each packet to be transmitted. This is accomplished using a shared secret key (SSK) that is shared by the source node 12 and the destination/intermediary node 14. The cryptographic special value 30 is then stored (hidden) in one (or more) of the fields 26 within the header portion 22. For example, the special value 30 may be placed in the ID field of the header portion 22. In order to achieve imperceptibility, the special value 30 placed in the field(s) 26 should possess the characteristics of the commonly used field value. By this it is meant that the special value 30 should have the same number of bits, same general format, same general range, and the like, as the value that is commonly found in that field (or fields) 26 of the header portion 22. In this way, there is nothing contained in the header fields 26 of the packet 20 which would indicate the presence of hidden information.

The packet 20 is then transmitted over the network 18 toward the destination/intermediary node 14. At the destination node 14 (or at an intermediary node, as desired), a cryptographic special value 30' is also computed 28' using the shared secret key (SSK) for each received packet. The destination/intermediary node 14 then compares 32 its computed special value 30' to the special value 30 contained in the field(s) 26 within the header portion 22 of the transmitted packet 20. If the special values match, the destination/intermediary node 14 has successfully authenticated the transmitted packet 20 as being sent from the source node 12.

Figure 3:
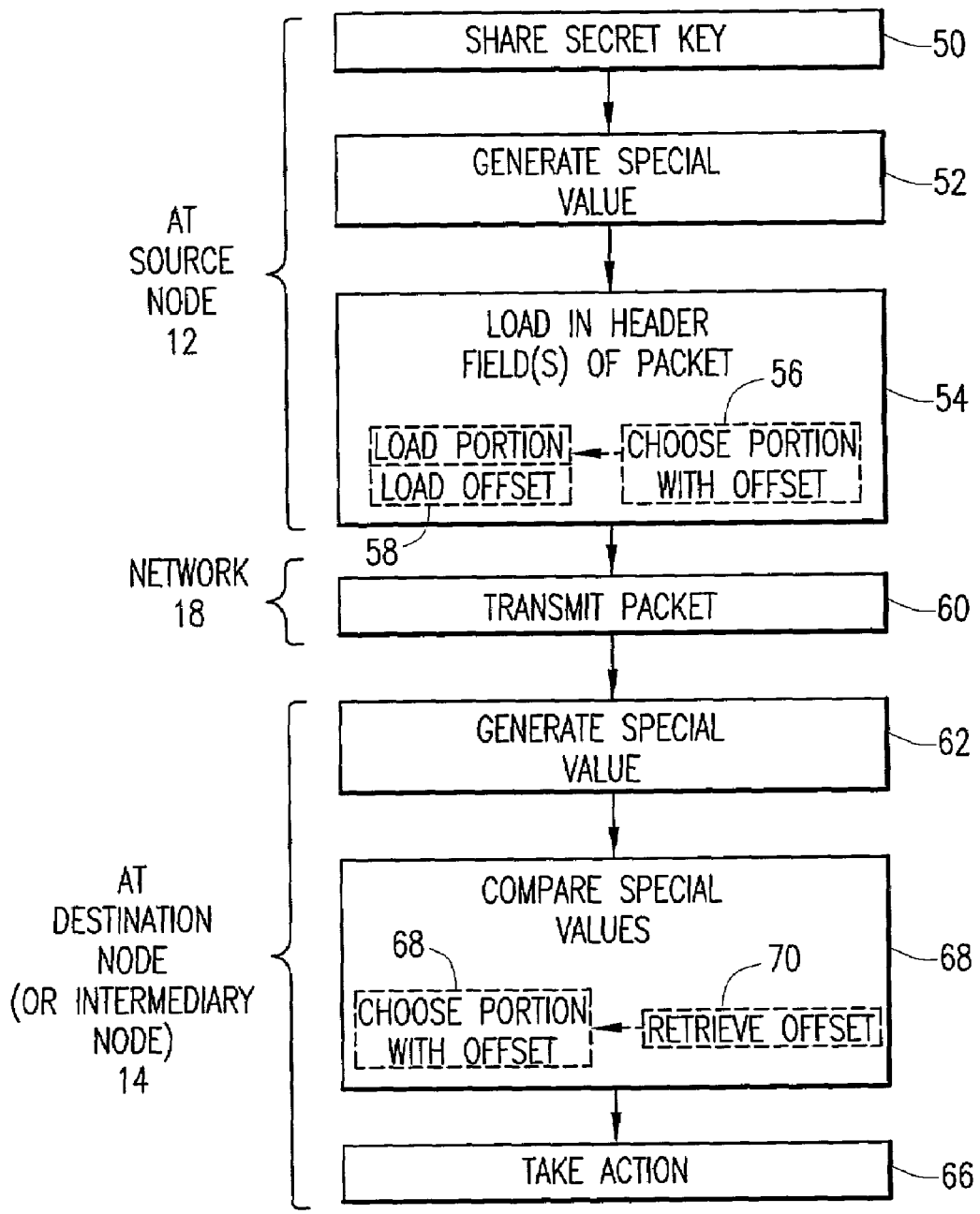
FIG. 3 is a flow diagram illustrating operation of the steganography process of the present invention.

Reference is now made to FIG. 3 wherein there is shown a flow diagram illustrating operation of the steganography process of the present invention. In step 50, the source node 12 and destination/intermediary node 14 share a secret cryptographic key (SSK). Next, in step 52, each time the source node 12 transmits a packet 20 toward the destination/intermediary node 14, a special value 30 is cryptographically generated using the shared secret cryptographic key. In step 54, the special value 30 is then loaded into one or more fields 26 within the header portion 22 of the transmitted packet 20.

More specifically, the special value 30 is computed in step 52 as a cryptographic hash of the following four values: (a) the destination address (provided in the destination field of the header portion 22); (b) the data payload (provided in the payload portion 24); (c) the current time; and (d) the shared secret cryptographic key. Any suitable hash algorithm may be used to compute the cryptographic hash. As an example, the SHA algorithm, MD5 algorithm, or HMAC algorithm, known to those skilled in the art may be used to generate the cryptographic hash. This cryptographic hash is then loaded into a first field 26(1) of the header portion 22 as the special value 30.

It is recognized that in some instances the number of bits comprising the cryptographic hash will exceed the number of bits available in the first field 26(1) within the header portion 22 of the transmitted packet 20. For example, the SHA algorithm generates a cryptographic hash that is 160-bits long, and the ID field of the IP header portion 22 is only 16-bits long. If that is the case, only a portion of the generated cryptographic hash is sent in the header portion 22 as the special value 30. An offset is then used in step 56 (optional) to pick the portion of the generated cryptographic hash that is used for the cryptographic special value 30. For example, assume that the field 26 within the header portion 22 is n bits long, the cryptographic special value 30 is accordingly bits "offset" to "offset+n" of the step 52 generated cryptographic hash. In one embodiment of the present invention, the offset is agreed to by the source node 12 and destination/intermediary node 14, and may be shared there between in step 50 when the secret cryptographic key is shared. In another embodiment, the offset is presumed by both the source node 12 and destination/intermediary node 14 to be zero, in which case the cryptographic special value 30 is accordingly the first n bits of the step 52 generated cryptographic hash. In yet another embodiment, the source node 12 generates the offset as a random number (rand#) using a random number generator, in which case the cryptographic special value 30 is accordingly bits "rand#" to "rand#+n" of the step 52 generated cryptographic hash.

It will, of course, be recognized that if the first field 26(1) is large enough to completely contain the generated cryptographic hash, then the cryptographic special value 30 loaded into the first field 26(1) within the header portion 22 of the transmitted packet 20 will be the entire cryptographic hash itself.

If a non-zero offset is used, and if that offset is not previously agreed to by the source node 12 and destination/intermediary node 14 (such as with the random number embodiment), the offset value must be provided in some manner to the destination/intermediary node 14 for its use on packet receipt to authenticate the packet. An optional step 58 is accordingly included to save the offset value (for example, rand#) in a second field 26(2) within the header portion 22 of the transmitted packet 20. In this scenario, the special value 30 may accordingly be seen as a combination of the selected portion of the generated cryptographic hash and the offset value as saved in the first field 26 (1) and second field 26 (2), respectively, of the header portion 22.

It is recognized that in some instances the range of values comprising the offset value will be different than range of values usually contained in the second field 26(2) within the header portion 22 of the transmitted packet 20. For example, the random number generator may generate a random number in the range of 0-144. This number then specifies the offset in bits used to find the portion of the generated cryptographic hash that is used for the cryptographic special value 30. However, if the origination (source) port of the header portion 22 is used as the second header field 26(2), numbers in the range of 0-144 may appear strange and may give away the presence of steganographically hidden information in the packet 20, thus violating the imperceptibility requirement. To address this concern, the random number value is scaled in the loading step 58 by a fixed or an agreed upon amount (for example, +1024 for source ports) so that the value stored in the origination (source) port field 26(2) would appear with a casual observation to be a valid source port address.

Once the packet 20 is formed with the included cryptographic special value 30 (saved in one or more header fields 26 of header portion 22, as discussed above), the packet is transmitted in step 60 over the network 18 toward the destination/intermediary node 14. Importantly, because of the efforts used as described above in formatting the cryptographic special value 30 for inclusion in the header field(s), the transmitted packet 20 looks no different from casual observation than any other packet and thus draws no attention to itself and its hidden contents.

Figure 4:
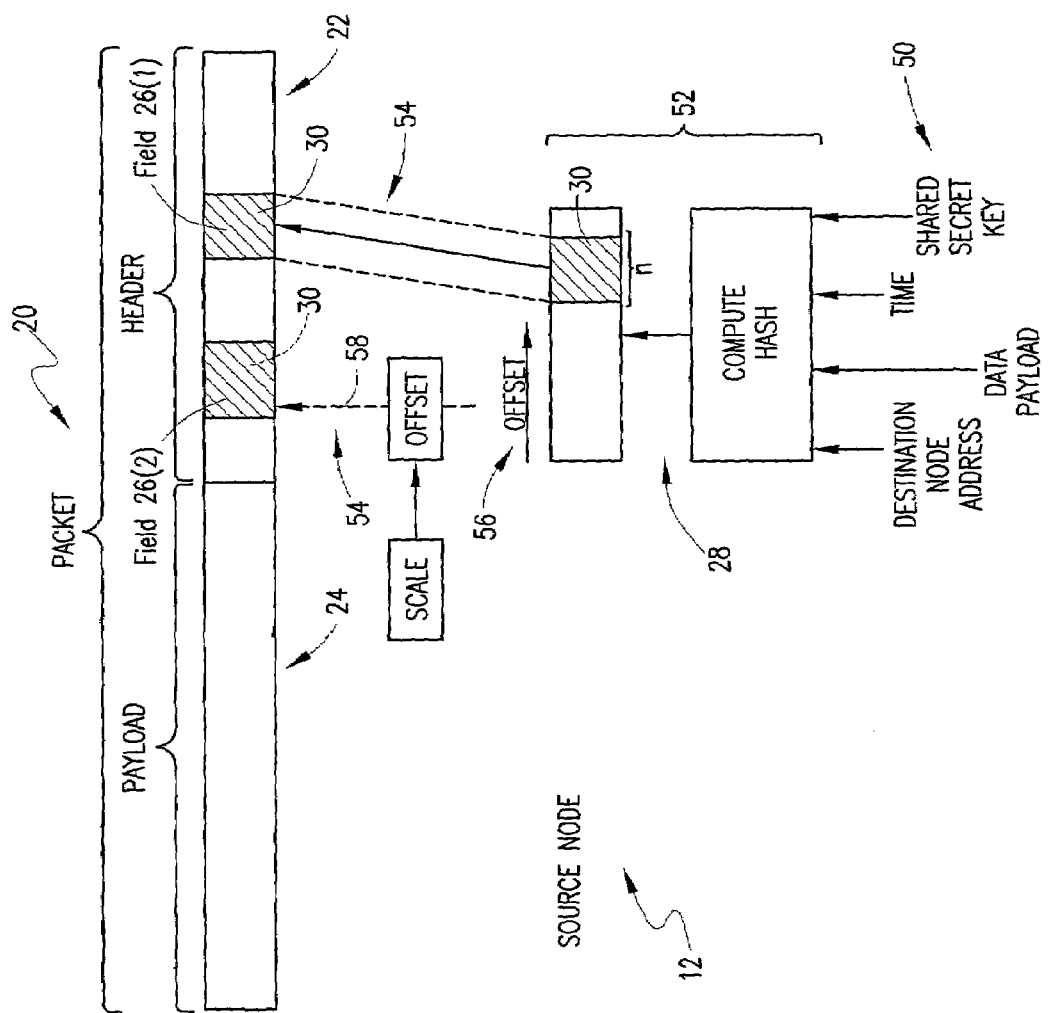
FIG. 4 is a graphical representation of the FIG. 3 process performed at the source node.

The portion of the FIG. 3 process performed at the source node 12 is graphically represented in FIG. 4.

At the destination/intermediary node 14, a special value 30' is cryptographically generated in step 62 using the shared secret cryptographic key. The special value 30' for the destination/intermediary node 14 is then compared in step 64 to the special value 30 contained within the transmitted packet 20. Action is then taken in step 66 as a result of that comparison. For example, if the special values do not match, the packet 20 may be rejected for lack of authenticity. Alternatively, or additionally, the packet 20 may be saved for further analysis. Still further, alternatively or additionally, an alarm may be generated in response to receipt of the packet 20. Other options for handling and response as needed for certain applications will be recognized by those skilled in the art. Although not specifically illustrated, it will be understood that if the authentication is performed at an intermediary node, and if authentication is passed, the packet 20 is then forwarded on from the intermediary node to the destination node.

More specifically, the destination/intermediary node 14 special value 30' is computed in step 62, like that for the source node 12, as a cryptographic hash of the following four values: (a) the destination address (the destination node's own address or the destination address as extracted by the intermediary node from the packet); (b) the data payload (extracted from the payload portion 24 of the received packet); (c) the current time; and (d) the shared secret cryptographic key (obtained earlier in step 50). Any suitable hash algorithm may be used to compute the cryptographic hash. As an example, the SHA algorithm, MD5 algorithm, or HNAC algorithm, known to those skilled in the art may be used to generate the cryptographic hash.

In the event that the first field 26(1) is large enough to completely contain the generated cryptographic hash, then the cryptographic special value 30' is simply compared in step 64 bit-by-bit with the value contained in the first field 26(1) within the header portion 22 of the transmitted packet 20.

If there are bit limitations within the first field 26(1), however, the process of step 62 must further determine the cryptographic special value 30' from the computed hash value. For example, where only a portion of the source node 12 generated cryptographic hash is sent as the cryptographic special value 30, the destination/intermediary node 14 must generate a corresponding portion of its generated cryptographic hash as the cryptographic special value 30'. An offset is thus used in step 68 (optional) to pick the portion of the generated cryptographic hash that is used for the cryptographic special value 30'. In the embodiment of the present invention where the offset is previously agreed to by the source node 12 and destination/intermediary node 14 (for example, at step 50 secret cryptographic key sharing), bits "offset" to "offset+n" of the step 62 generated cryptographic hash are selected for the step 64 comparison of special values. In the embodiment of the present invention where the offset is presumed by both the source node 12 and destination/intermediary node 14 to be zero, the first n bits of the step 62 generated cryptographic hash are selected for the step 64 comparison of special values. Furthermore, in the embodiment of the present invention where the offset is a randomly selected value, the value is retrieved from the second header field 26(2) and de-scaled in optional step 70 (if necessary) to obtain the random number (rand#), with bits "rand#" to "rand#+n" of the step 62 generated cryptographic hash then being selected for the step 64 comparison of special values.

Figure 5:
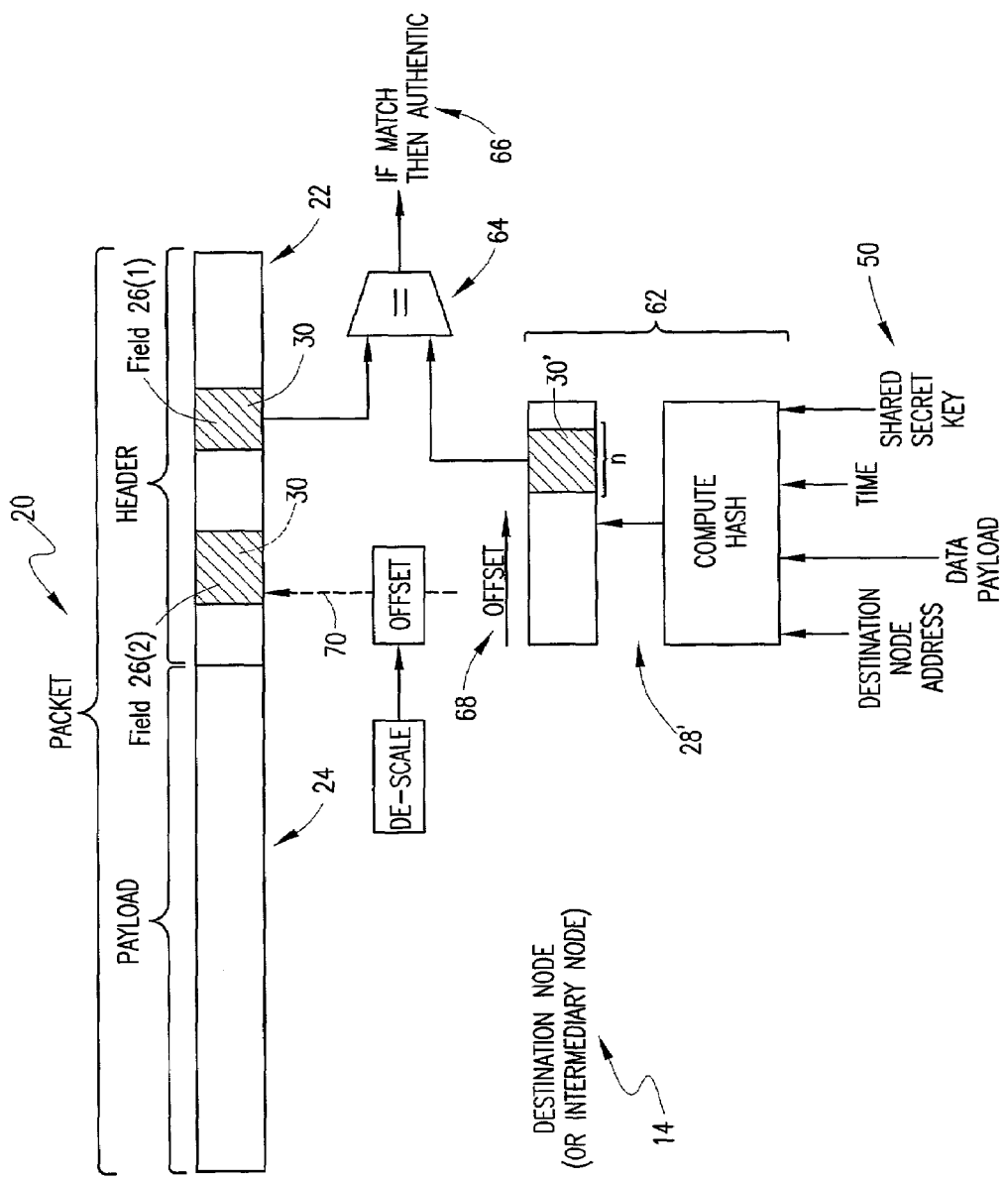
FIG. 5 is a graphical representation of the FIG. 3 process performed at the destination/intermediary node.

The portion of the FIG. 3 process performed at the destination/intermediary node 14 is graphically represented in FIG. 5.

In order to ensure proper authentication, the source node 12 and destination/intermediary node 14 must have at least loosely synchronized clocks. The reason for this is that in a preferred embodiment, as discussed above, the cryptographic hash computed in steps 52 and 62 utilizes current time as one of the four input values. The degree of clock synchronization required depends of the degree of granularity to which the system must be able to ensure authentication. For example, the clocks may be synchronized to the hour, half hour, quarter hour, minute or second, depending on the authentication security needs of the network 18 and its included nodes. For example, if the clocks are synchronized to an hour degree, this would allow an hour within which an enemy could analyze the packet 20 traffic between the nodes 12 and 14 and attempt to reuse (or replay) the packet communications (because the time variable in the hash would be fixed for all traffic during that hour period). If the network administrator believes that a successful replay attack could be made within an hour, than the hour degree is too long to ensure security within the network and a more stringent time synchronization would be necessary.

The method and system of the present invention advantageously allows for the generation and verification of cryptographically signed IP traffic in an implementation where the authentication information is hidden in the packet headers in a manner such that the traffic containing hidden information cannot be readily distinguished from the traffic that does not contain hidden information. More specifically, the traffic containing hidden information can be distinguished and authenticated only by a receiving entity or third party that understands how the steganographic (information-hiding) algorithm operates and who also possesses the cryptographic secret key.

Figure 6:
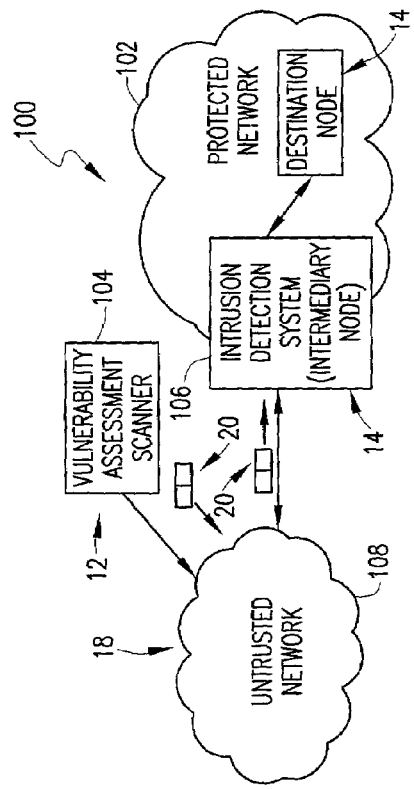
FIG. 6 is a block diagram of a network defense system that utilizes the steganography process of the present invention.

Reference is now made to FIG. 6 wherein there is shown a block diagram of a network defense system 100 that utilizes the steganography process of the present invention. The network defense system 100 is used to provide a level of protection for a network 102 against attacks from outside the network. The network defense system 100 includes a vulnerability assessment scanner 104 that is designed to discover vulnerabilities of the protected network 102 system, allowing network managers to find and patch network security holes before they are discovered by hackers. More specifically, the vulnerability assessment scanner 104 assesses the protected network 102 for computer system and network device vulnerabilities which may arise at any time in connection with, for example, the installation of a new client, server, networking device or application (generally shown as a "destination node" within the trusted network 102). The assessment provided by the vulnerability assessment scanner 104 produces enterprise (i.e., network 102) specific data identifying potential computer system and network device vulnerabilities (for example, an inventory of the active hosts on the network, the services provided by those hosts, and the known vulnerabilities of the hosts). The produced data is supplied by the scanner and used to trigger the taking of certain threat mitigation or elimination actions (either automatically or manually).

The assessment operation performed by the scanner 104 operates at three depths: normal; deep; and, ultra-deep. The normal depth scan generally comprises basic scans of the network 102 that are fast and do not crash a host. For example, the normal scan may determine the operating system (and its version), the service applications on the host, the software version for those services. The deep depth scan performs vulnerability assessments that can be safely executed without crashing a host. Deep depth scans interact with the services on a host to determine whether a vulnerability exists. The deep scan generally takes more time than the normal scan. The ultra-deep scan tests for all known vulnerabilities, even at the risk of crashing a host. Ultra-deep scans may actually perform an attack on the network 102 to determine vulnerability and interact with the actual service in such a way that it might compromise the system.

The system 100 further includes an intrusion detection system 106 that is designed to expose intruders, break off the intrusion, examine the intruder's point of entry and prevent future intruders from using the same entry point. The intrusion detection system 106 operates to examine packet traffic in comparison to a detection signature. This signature specifies certain criteria that must be found in a packet or collection of packets in order detect a potential threat to the network 102. In the event the criteria are satisfied, the intrusion detection signature may take action of various kinds (as specified by the signature) in response to the threat.

The vulnerability assessments generated by the scanner 104 are presented to a network administrator, in detail or summary form, with enough information for the administrator to make a rapid, high level decision on responding to the vulnerability. The information provided to the administrator may include severity assessment and links to vendor patches and other pertinent data from the web that would assist in addressing the vulnerability. Responsive to this presentation, the network administrator may specify the actions to be taken in order to defend the network 102. For example, the actions may include specifying a detection signature to be applied by the intrusion detection system 106 against monitored traffic.

The actions of the vulnerability assessment scanner 104 scan the network 102 and further to, perhaps, simulate an attack on the network, raise a number of concerns. Primarily, the scans and/or simulated attacks are perceived by the intrusion detection system as a potential/actual attack and appropriate response may be taken against the attack. This responsive action may preclude the scanner 104 from completing its scan and identifying all vulnerabilities. It further results in the generation of false positive alarms by the intrusion detection system. A need accordingly exists for a way to allow the vulnerability assessment scanner to probe the network 102 with packet traffic without fear of triggering false alarms and unnecessary intrusion detection system 106 response.

The steganography process of the present invention addresses the foregoing need. More specifically, and with reference to FIGS. 1-5, the scanner 104 comprises the source node 12 and the intrusion detection system 106 comprises the intermediary node 14 (with the server, host, port, application, and the like, in the trusted network 102 comprising the destination node 14). The destination/intermediary node 14 may alternatively comprise intrusion detection system 106 itself in some applications. The network 18 may be viewed as an untrusted network 108 over which third party threats to the protected network 102 are manifested, and also as the network over which the scanner 104 performs its probe of the protected network 102. Utilizing the steganography process of the present invention, the scan/probe traffic packets 20 generated by the scanner 104 include hidden information that may be detected only by the intrusion detection system 106 and used to signal that the source of the traffic is the scanner and not a third party threat. Once this recognition is made, the traffic packets may be allowed by the intrusion detection system 106 to pass into the protected network 102 without having false positive alarms be generated and/or without having the traffic be blocked before a complete and thorough assessment of network vulnerabilities is completed.

In this regard, the steganography process serves an important function of allowing the intrusion detection system 106 (as intermediary node 14) to recognize the traffic (which appears to be threatening) as being authorized and authenticated. Importantly, no other party will be able to recognize that the vulnerability scanner 104 has generated the traffic, and no other party will be able to generate traffic that can be authenticated by the intrusion detection system 106. Furthermore, no third party will be able to change the scanner-generated packets and avoid detection, or capture the scanner's packets and replay them.

The following requirements for operation in the network defense environment are all met through the use of the steganography process of the present invention:

Authentication: the intrusion detection system must be able to distinguish between scanner-generated traffic and all other traffic without error. Then, the intrusion detection system can safely ignore the scanner's attacks while blocking and alarming on all other attacks;

Integrity: the intrusion detection system must be able to verify that the contents of the scanner's packets were not modified in transit;

Performance: the operation must not place significant load on either the sender (scanner) or verifier (intrusion detection system);

Constant Change: the scanner must be able to change its IP address as often as on a per-packet basis, to enable the scanner to protect itself from discovery and to protect itself from direct attack. Thus, the intrusion detection system must not need to know the scanner's IP address; and Generality: the operation must apply generally to all IP transmissions.

The "integrity" requirement is met through the use of the hidden information used to authenticate the traffic, and by having the entire packet payload used in the determination of the hash. The "performance" requirement is met by utilizing an efficient hash algorithm tailored to the defense needs of the network. The "constant change" requirement is met by not requiring that the origination address of the scanner be used in the authentication process. The "generality" requirement is met by having the authentication process utilize available IP header fields to hide the authentication information.

The operation in the network defense environment further requires resistance to the following types of attack:

Spoofing Attack: an attacker must not be able to generate traffic that looks like it came from the scanner and wage attacks that the intrusion detection system will ignore;

Man-in-the-Middle Attack: an attacker must not be able to intercept the scanner's packets in transit and modify their contents such that the modifications go undetected;

Replay Attack: an attacker must not be able to capture the scanner's packets with a sniffer and replay the attacks against different targets, or against the same target at a later time;

Attack Against the Scanner: an attacker must not be able to distinguish the scanner-generated transmissions from any other traffic. If an attacker can identify the scanner, he may feed the scanner bogus data, or he may attack the scanner directly.

Resistance to the "spoofing attack" is provided through use of the hidden information based on a shared secret key to authenticate scanner generated traffic. Additionally, the third party will not be able to distinguish scanner packets from other packets because the authentication information is hidden in the normal packet headers and is indistinguishable from arbitrary probe traffic. The "man-in-the-middle attack" is resisted because the hash is generated from the payload. Resistance to the "replay attack" is provided because the hash is determined using the current time value and further because the hash is determined using the destination IP address. Finally, the "attack against the scanner" is resisted because the address of the scanner is allowed to constantly change.

A number of benefits thus accrue from use of the steganography process in the network defense environment:

a third party cannot tell scanner packets from other packets because the authentication information is hidden in the normal packet headers and is indistinguishable from arbitrary probe traffic;

the attacker cannot spoof packets that look like they came from the scanner because the attacker does not know the secret key;

the attacker cannot capture the scanner's packets and replay them against a different target because the target IP is included in the hash;

the attacker cannot capture the scanner's packets and replay them against the same target because the timestamp is included in the hash; and the attacker cannot modify the scanner's packet contents in transit because the entire IP payload is used as input data to the hash function.

The loose synchronization of the clocks in the source node 12 and destination 14 was mentioned previously. This operational feature is also applicable to the network defense embodiment of the steganography process. The level of synchronization is directly determined by the length of time for which protection against replay attacks against the same target must be maintained. For example, an attacker will only have a window of opportunity that is a minute long if the clocks are synchronized to a minute resolution. Note that, in the event that the timestamp is close to a minute boundary, and the clocks are synchronized to within a minute, the intrusion detection system may need to compute two hash values (one for the time stamp on each side of the boundary) and check if either matches the packet. These concepts can be extended depending on the protection required and the level of synchronization available. If no protection is required, the timestamp can be dropped completely from the hash algorithm and clocks need not be synchronized at all.

It was also mentioned previously that the value 30 could be stored in the IP ID header field. The result of this is that the IP ID stored in the field will appear completely random to someone who collects and analyzes the scanner's packets. This technique works extremely well for the scanner, because the scanner is launching attacks and attack tools usually randomize IP IDs. However, if this technique is applied to a large amount of non-attack traffic, a third party may be able to recognize that the traffic is different from normal operating system traffic. The difference arises because most operating systems (OpenBSD is an exception) do not randomize IP IDs in practice, although randomization is recommended for security reasons.

Although a preferred implementation utilizes the SHA algorithm for hash calculation, other algorithms may be used. For example, MD5 provides an alternative algorithm. Additionally, if a need exists for the hash to be stronger, a real keyed hash, like HMAC, may be used. Alternatively, if only a weaker hash is needed to provide the requisite level of security, a DES algorithm or checksum algorithm could be used for the hash, with a benefit of increased speed.

With reference once again to FIG. 1, it will be understood that in the implementation where both an intermediary node and a destination node are present, that the intermediary node acts as an authentication monitoring agent or gateway. In this architecture, it is only when the intermediary node can successfully authenticate the packet communications based on the steganographic process that the packet is permitted to be forwarded on toward the destination node. As an alternative, the intermediary node may, in fact be the addressed destination of the packet, but the payload data is instead intended for delivery to a true destination node. In this architecture, the addressee destination node acts as an intermediary, authenticates the packet, and then, if authentication is successful, forwards the included payload data on toward the true destination node. Other operations implicating destination/intermediary nodes, in the context of steganographically authenicated packet communications, may be implemented in a manner obvious to those skilled in the art.

Although preferred embodiments of the method and apparatus of the present invention have been illustrated in the accompanying Drawings and described in the foregoing Detailed Description, it will be understood that the invention is not limited to the embodiments disclosed, but is capable of numerous rearrangements, modifications and substitutions without departing from the spirit of the invention as set forth and defined by the following claims.

What is claimed is:

1. A method, comprising:

at a source node:

cryptographically generating a first value relating to a communications packet which includes a packet header portion, the packet header portion including at least one field specified by a communications protocol to store protocol-specified packet header data having a value that falls within a predetermined numerical data range, scaling the cryptographically generated first value to fall within that predetermined numerical data range; and storing the scaled first value, instead of the protocol-specified packet header value, in the at least one field of the packet header portion of the communications packet;

transmitting the communications packet from the source node to a destination/intermediary node; and at the destination/intermediary node where the communications packet is received:

cryptographically generating a second value relating to the received communications packet and scaling that second value;

extracting the scaled first value from the field of the packet header portion within the received communications packet;

comparing the extracted scaled first value with the generated scaled second value; and authenticating the received communications packet as originating from the source node if the comparison indicates a match between the extracted scaled first value and the generated scaled second value.

2. The method as in claim 1 further including agreeing between the source and destination/intermediary nodes as to a shared secret key to be used by both in cryptographically generating.

3. The method as in claim 2 wherein cryptographically generating each comprise generating a cryptographic hash value using the shared secret key.

4. The method as in claim 1 wherein:
cryptographically generating the first value comprises generating the first value based on an address of the destination node; and
cryptographically generating the second value comprises generating the second value based on the destination node address.

5. The method as in claim 1 wherein:
cryptographically generating the first value comprises generating the first value based on a data payload contained in a payload portion of the communications packet; and
cryptographically generating the second value comprises:
extracting the data payload from the payload portion of the received communications packet; and
generating the second value based on the extracted data payload.

6. The method as in claim 1 wherein:
cryptographically generating the first value comprises generating the first value based on a current time of source node transmission of the communications packet; and
cryptographically generating the second value comprises generating the second value based on a current time of destination/intermediary node receipt of the communications packet.

7. The method as in claim 6 wherein the current times of transmission and receipt are measured with a granularity selected from the group consisting of: hour, half hour, quarter hour and minute.

8. The method as in claim 1 wherein:
cryptographically generating the first value comprises generating the first value based on a combination of destination node address, data payload in the payload portion, and current time of source node transmission of the communications packet; and
cryptographically generating the second value comprises generating the second value based on destination node address, data payload extracted from the received communications packet, and a current time of destination node receipt of the communications packet.

9. The method as in claim 1 wherein:
cryptographically generating the first value comprises:
generating a first cryptographic hash value comprised of a plurality of bits; and
selecting certain ones less than all of those plurality of bits as the first value, the selected number of bits matching a number of bits available within the field of the packet header portion; and
cryptographically generating the second value comprises:
generating a second cryptographic hash value comprised of a plurality of bits; and
selecting certain ones less than all of those plurality of bits as the second value.

10. The method as in claim 9 wherein generating each include generating the cryptographic hash using a shared secret key and a plurality of values relating to the communications packet.

11. The method as in claim 10 wherein the plurality of values comprise packet communications time, destination node address and communications packet data payload.

12. The method as in claim 9 wherein selecting each include choosing an offset pointing to which of the plurality of bits will be selected.

13. The method as in claim 12 wherein the offset is agreed upon between the source node and destination/intermediary node.

14. The method as in claim 12 wherein the offset is a number chosen by the source node, the method further comprising:
storing the offset number by the source node in at least one other field of the header portion of the communications packet;
extracting the offset number by the destination/intermediary node from the other header field of the received communications packet; and
using the extracted offset number when cryptographically generating the second value to choose the plurality of bits from the second cryptographic hash value as the second value.

15. method as in claim 14 wherein the offset number is a random number chosen by the source node.

16. The method as in claim 1 wherein:
the source node comprises a vulnerability assessment scanner for a network defense system;
the communications packet comprises vulnerability probe traffic; and
the destination/intermediary node comprises an intrusion detection system of the network defense system, the intrusion detection system recognizing the probe traffic as not being threatening if the first and second values match.

17. The method as in claim 1 wherein the field of the packet header portion is selected from the group consisting of an origination/source field, a destination field and a packet identification field.

18. The method as in claim 1 wherein the stored scaled first value possesses, in addition to having the predetemined numerical data range, also a same format characteristics as the protocol-specified value for the field of the packet header portion.

19. The method as in claim 1 wherein the field of the packet header portion is selected from the group consisting of an origination/source field, a destination field and a packet identification field, and wherein the scaled first value possesses, in addition to having the predetemined numerical data range, also a same format characteristics as the protocol-specified value for the field of the packet header portion.

20. The method as in claim 1 wherein, following storage of the scaled first value in the at least one field of the header portion, the communications packet containing the scaled first value is indistinct in terms of data value range from a communications packet containing the protocol-specified value in the at least one field of the packet header portion.

21. The method as in claim 20 wherein indistinct means that traffic containing the in place of stored first value in the at least one field of the packet header portion cannot be readily distinguished based on numerical data value range from traffic that contains the protocol-specified value in the at least one field of the packet header portion.

22. A method, comprising:
at a source node:
cryptographically generating a first value relating to a communications packet which includes a header portion including at least one field specified by a communications protocol to store header data having a common value falling within a numerical data range, the numerical data range having a predefined sub-set range of values, the first value being cyptographically generated to have a numerical data value that falls within the predefined sub-set range of values; and storing the first value in the at least one field of the header portion of the communications packet instead of the common value;

transmitting the communications packet from the source node to a destination/intermediary node; and at the destination/intermediary node where the communications packet is received:

cryptographically generating a second value relating to the received communications packet;

extracting the first value from the header field of the received communications packet;

comparing the extracted first value with the generated second value; and authenticating the received communications packet as originating from the source node if the comparison indicates a match between the extracted first value and the generated second value.

23. The method of claim 22 wherein the at least one header field comprises a source port field and the common value is a source port number falling within a range of source port values, the first value being cryptographically generated to fall within a subset range of values for source ports which subset is within the range of source port values.

24. The method of claim 23 wherein cryptographically generating further comprises scaling the first value to fall within the subset range of values for source ports.

25. A communications method, comprising:

at a source node:

generating a communications packet for transmission in accordance with a communications protocol specifying use of non-cryptographic packet header field data having a value specified by the protocol to fall within a portion of a numerical data range for that packet header field of the communications packet;

cryptographically generating a first value relating to the communications packet to fall within the portion of the numerical data range, and storing the cryptographically generated first value, instead of the non-cryptographic packet header field data value, in the certain packet header field of the communications packet such that the presence of the cryptographically generated first value in the communications packet header field is imperceptible from presence of the non-cryptographic packet header field data;

transmitting the source node generated communication packet over a network in accordance with the communications protocol; and at a destination/intermediary node:

receiving the communications packet; and authenticating the received communications packet as originating from the source node if a destination/intermediary node cryptographically generated second value relating to the received communications packet matches the first value extracted from the certain packet header field of the received communications packet.

26. The method as in claim 25 further including agreeing between the source and destination/intermediary nodes as to a shared secret key to be used by both in cryptographically generating.

27. The method as in claim 26 wherein cryptographically generating each comprise generating a cryptographic hash value using the shared secret key.

28. The method as in claim 25 wherein:

cryptographically generating the first value comprises generating the first value based on an address of the destination node; and cryptographically generating the second value comprises generating the second value based on the destination node address.

29. The method as in claim 25 wherein:

cryptographically generating the first value comprises generating the first value based on a data payload contained in a payload portion of the communications packet; and cryptographically generating the second value comprises:

extracting the data payload from the payload portion of the received communications packet; and generating the second value based on the extracted data payload.

30. The method as in claim 25 wherein:

cryptographically generating the first value comprises generating the first value based on a current time of source node transmission of the communications packet; and cryptographically generating the second value comprises generating the second value based on a current time of destination/intermediary node receipt of the communications packet.

31. The method as in claim 30 wherein the current times of transmission and receipt are measured with a granularity selected from the group consisting of: hour, half hour, quarter hour and minute.

32. The method as in claim 25 wherein:

cryptographically generating the first value comprises generating the first value based on a combination of destination node address, data payload in the payload portion, and current time of source node transmission of the communications packet; and cryptographically generating the second value comprises generating the second value based on destination node address, data payload extracted from the received communications packet, and a current time of destination node receipt of the communications packet.

33. The method as in claim 25 wherein:

cryptographically generating the first value comprises:

generating a first cryptographic hash value comprised of a plurality of bits; and selecting certain ones less than all of those plurality of bits as the first value, the selected number of bits matching a number of bits available within the field of the packet header portion; and cryptographically generating the second value comprises:

generating a second cryptographic hash value comprised of a plurality of bits; and selecting certain ones less than all of those plurality of bits as the second value.

34. The method as in claim 33 wherein generating each include generating the cryptographic hash using a shared secret key and a plurality of values relating to the communications packet.

35. The method as in claim 34 wherein the plurality of values comprise packet communications time, destination node address and communications packet data payload.

36. The method as in claim 35 wherein:
the source node comprises a vulnerability assessment scanner for a network defense system;
the communications packet comprises vulnerability probe traffic; and
the destination/intermediary node comprises an intrusion detection system of the network defense system, the intrusion detection system recognizing the probe traffic as not being threatening if the first and second values match.

37. The method as in claim 25 wherein the certain packet header field is selected from the group consisting of an origination/source field, a destination field and a packet identification field.

38. The method as in claim 25 wherein cryptographically generating the first value comprises scaling a cryptographically generated value to fall within the portion of the numerical data range.

* * * * *

UNITED STATES PATENT AND TRADEMARK OFFICE
CERTIFICATE OF CORRECTION

PATENT NO. : 7,590,855 B2  Page 1 of 1
APPLICATION NO. : 10/136896
DATED : September 15, 2009
INVENTOR(S) : Victoria Lynn Irwin It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1290 days.

Signed and Sealed this

Twenty-first Day of September, 2010

David J. Kappos
*Director of the United States Patent and Trademark Office*